United States Patent
Pennsiriwongse

(10) Patent No.: US 9,062,700 B2
(45) Date of Patent: Jun. 23, 2015

(54) TOLERANCE RING WITH COMPONENT ENGAGEMENT STRUCTURES

(71) Applicant: James Pennsiriwongse, Bristol (GB)

(72) Inventor: James Pennsiriwongse, Bristol (GB)

(73) Assignee: Saint-Gobain Performance Plastics Rencol Limited, Coventry (GB)

( * ) Notice: Subject to any disclaimer, the term of this patent is extended or adjusted under 35 U.S.C. 154(b) by 0 days.

(21) Appl. No.: 13/926,841

(22) Filed: Jun. 25, 2013

(65) Prior Publication Data

US 2014/0017105 A1    Jan. 16, 2014

Related U.S. Application Data

(60) Provisional application No. 61/666,365, filed on Jun. 29, 2012.

(51) Int. Cl.
*F16B 17/00* (2006.01)
*F16D 1/08* (2006.01)

(52) U.S. Cl.
CPC ........... *F16B 17/00* (2013.01); *Y10T 403/7051* (2015.01); *F16D 1/0835* (2013.01)

(58) Field of Classification Search
CPC .... F16D 1/0835; F16B 17/00; F16C 2326/24; F16C 27/02; F16C 35/073; F16C 35/077; F16C 2370/12; G11B 5/4813; B62D 1/16
USPC .................. 403/367, 371, 372; 411/520, 521; 384/535, 581; 360/97.02, 265.2, 265.6, 360/266.1
See application file for complete search history.

(56) References Cited

U.S. PATENT DOCUMENTS

| | | | | |
|---|---|---|---|---|
| 3,061,386 A | * | 10/1962 | Dix et al. | 384/535 |
| 3,197,243 A | * | 7/1965 | Brenneke | 403/372 |
| 3,717,910 A | | 2/1973 | Fries | |
| 3,838,928 A | * | 10/1974 | Blaurock et al. | 403/372 |
| 3,958,311 A | | 5/1976 | Kusters et al. | |
| 4,479,735 A | | 10/1984 | Thompson et al. | |
| 4,619,373 A | | 10/1986 | Galer | |
| 4,828,423 A | * | 5/1989 | Cramer et al. | 403/372 |
| 4,981,390 A | * | 1/1991 | Cramer et al. | 403/371 |
| 5,031,452 A | | 7/1991 | Dobson et al. | |
| 5,527,045 A | | 6/1996 | Pondelick et al. | |

(Continued)

FOREIGN PATENT DOCUMENTS

| | | |
|---|---|---|
| CA | 1064545 A | 10/1979 |
| CN | 201257745 Y | 6/2009 |

(Continued)

OTHER PUBLICATIONS

International Search Report for PCT/GB2013/051705 mailed on Oct. 8, 2013, 1 page.

*Primary Examiner* — Joshua Kennedy
(74) *Attorney, Agent, or Firm* — Chi Suk Kim; Abel Law Group, LLP

(57) ABSTRACT

A tolerance ring is disclosed and can include a generally cylindrical body having a side wall that defines a top, and a bottom. The side wall includes a plurality of wave structures that extend from the sidewall in a first direction and a first plurality of component engagement structures that extend from the sidewall in a second direction opposite the first direction. Each of the first plurality of component engagement structures can be configured to at least partially extend into and engage a first component to which the tolerance ring is assembled.

20 Claims, 11 Drawing Sheets

(56) References Cited

U.S. PATENT DOCUMENTS

| | | | |
|---|---|---|---|
| 5,662,362 | A | 9/1997 | Kapgan et al. |
| 5,815,345 | A | 9/1998 | Pelstring et al. |
| 6,565,261 | B1 | 5/2003 | Uchiyama et al. |
| 6,754,046 | B2* | 6/2004 | Barina et al. ............... 360/265.6 |
| 6,889,956 | B2* | 5/2005 | Gutierrez et al. ............. 251/214 |
| 7,175,388 | B2 | 2/2007 | Labbe et al. |
| 7,645,116 | B2 | 1/2010 | Kawasaki et al. |
| 7,768,168 | B2 | 8/2010 | Aschoff et al. |
| 7,911,108 | B2 | 3/2011 | Hayashi |
| 7,950,154 | B2 | 5/2011 | Leimann |
| 2004/0076356 | A1 | 4/2004 | Kapaan et al. |
| 2005/0225903 | A1* | 10/2005 | Sprankle et al. ........... 360/264.3 |
| 2007/0039148 | A1 | 2/2007 | Neumeier |
| 2007/0140803 | A1 | 6/2007 | Filho |
| 2007/0291417 | A1* | 12/2007 | Woodhead et al. ........ 360/265.2 |
| 2008/0199254 | A1* | 8/2008 | Baker et al. ................... 403/372 |
| 2009/0256341 | A1* | 10/2009 | Okada et al. .................. 280/775 |
| 2010/0003076 | A1 | 1/2010 | Slayne |
| 2010/0073820 | A1* | 3/2010 | Slayne et al. ................. 360/220 |
| 2010/0224672 | A1 | 9/2010 | Mortimer |
| 2011/0076096 | A1* | 3/2011 | Slayne et al. ................. 403/372 |
| 2012/0240350 | A1* | 9/2012 | Natu et al. ...................... 16/2.2 |
| 2013/0105267 | A1* | 5/2013 | Nakamura et al. ........... 192/56.1 |

FOREIGN PATENT DOCUMENTS

| | | | |
|---|---|---|---|
| CN | 101915725 | A | 12/2010 |
| CN | 201674175 | U | 12/2010 |
| DE | 1296893 | B * | 6/1969 ............... F16D 1/08 |
| DE | 3615597 | A1 | 11/1987 |
| DE | 112008001379 | T5 | 4/2010 |
| EP | 0259691 | A2 | 3/1988 |
| EP | 1136999 | A2 | 9/2001 |
| FR | 2637260 | A1 | 4/1990 |
| GB | 1425465 | | 2/1967 |
| GB | 1124930 | | 8/1968 |
| GB | 1167587 | | 10/1969 |
| GB | 1188678 | | 4/1970 |
| GB | 1389552 | | 4/1975 |
| GB | 1421481 | | 2/1976 |
| GB | 1470049 | | 4/1977 |
| JP | 58-114826 | A | 7/1983 |
| JP | 58-116036 | A | 7/1983 |
| JP | 59-191504 | A | 10/1984 |
| JP | 59-231164 | A | 12/1984 |
| JP | 60-39363 | A | 3/1985 |
| JP | 60-128839 | A | 7/1985 |
| JP | 60-190151 | A | 9/1985 |
| JP | 61-132063 | A | 6/1986 |
| JP | 63-255591 | A | 10/1988 |
| JP | 1-308763 | A | 12/1989 |
| JP | 3-15245 | A | 1/1991 |
| JP | 4-12648 | A | 1/1992 |
| JP | 4-125048 | A | 4/1992 |
| JP | 5-71647 | A | 3/1993 |
| JP | 5-141591 | A | 6/1993 |
| JP | 7-112730 | A | 5/1995 |
| JP | 10-23695 | A | 1/1998 |
| JP | 10-222906 | A | 8/1998 |
| JP | 10-277612 | A | 10/1998 |
| JP | 11-285409 | A | 10/1999 |
| JP | 2000-324742 | A | 11/2000 |
| JP | 2002-249112 | A | 9/2002 |
| JP | 2004-245699 | A | 12/2004 |
| JP | 2009-183058 | A | 8/2009 |
| JP | 2009-293720 | A | 12/2009 |
| JP | 2009-293721 | A | 12/2009 |
| JP | 2010-130885 | A | 6/2010 |
| JP | 2011-166934 | A | 8/2011 |
| JP | 2011-172335 | A | 9/2011 |
| JP | 2011-172432 | A | 9/2011 |
| SE | 526723 | C2 | 11/2005 |
| TW | 201104119 | A1 | 2/2011 |
| WO | 02/36034 | A1 | 5/2002 |

* cited by examiner

TOLERANCE RING WITH COMPONENT ENGAGEMENT STRUCTURES

CROSS-REFERENCE TO RELATED APPLICATION(S)

This application claims priority under 35 U.S.C. §119(e) to U.S. Patent Application No. 61/666,365 entitled "TOLERANCE RING WITH COMPONENT ENGAGEMENT STRUCTURES," by James Pennsiriwongse, filed Jun. 29, 2012, which is assigned to the current assignee hereof and incorporated herein by reference in its entirety.

BACKGROUND

1. Field of the Disclosure

The present disclosure is directed to tolerance rings, particularly to tolerance rings for compressor motors, such as heating, ventilation, air-conditioning (HVAC) compressor motors.

2. Description of the Related Art

The present disclosure relates to tolerance ring assemblies, wherein a tolerance ring provides an interference fit between parts of an assembly, in which a first part has a cylindrical portion located in a cylindrical bore of a second part. In particular, the present disclosure relates to assemblies having a tolerance ring that provides an interference fit between a cylindrical component such as a flywheel or a bearing and a housing for the flywheel.

Improved engineering techniques have resulted in the need for greater accuracy of machine parts, raising manufacturing costs. Very close tolerances are required where press fits, splines, pins or keyways are employed to transmit torque in applications such as pulleys, flywheels, rotors, or drive shafts, or to prevent relative motions between parts, such as stators, main frames, lower frames, and compressor housings.

Tolerance rings may be used to provide an interference fit between parts required to transmit torque. Tolerance rings provide an efficient means of providing an interference fit between parts that may not be machined to exact dimensions. Tolerance rings have a number of other potential advantages, such as compensating for different linear coefficients of expansion between the parts, allowing rapid apparatus assembly, and durability.

A tolerance ring generally comprises a strip of resilient material, for example a metal such as spring steel, the ends of which are brought together to form a ring. A band of protrusions extend radially outwards from the ring, or radially inwards towards the center of the ring. Usually, the protrusions are formations, possibly regular formations, such as corrugations, ridges or waves.

When the ring is located in the annular space between, for example, a shaft and a bore in a housing in which the shaft is located, the protrusions are compressed. Each protrusion acts as a spring and exerts a radial force against the shaft and the surface of the bore, providing an interference fit between the shaft and the housing. Rotation of the housing or the shaft will produce similar rotation in the other of the shaft or the housing, as torque is transmitted by the tolerance ring. Typically, the band of protrusions is axially flanked by annular regions of the ring that have no formations (known in the art as "unformed regions" of the tolerance ring).

Although tolerance rings usually comprise a strip of resilient material that is curved to allow the easy formation of a ring by overlapping the ends of the strip, a tolerance ring may also be manufactured as an annular band. The term "tolerance ring" as used hereafter includes both types of tolerance ring. The term "shaft" as used hereafter includes any assembly component with a cylindrical portion, such as a shaft, flywheel, stator, rotor, main frame, lower frame, or a bearing.

Accordingly, the industry continues to need improvements in tolerance rings, particularly tolerance rings installed within compressor motors.

BRIEF DESCRIPTION OF THE DRAWINGS

The present disclosure can be better understood, and its numerous features and advantages made apparent to those skilled in the art by referencing the accompanying drawings.

The use of the same reference symbols in different drawings indicates similar or identical items.

DETAILED DESCRIPTION

The following description is directed to tolerance rings, and particularly, to tolerance rings that can be installed within a compressor assembly between a main frame and a compressor housing, a lower frame and a compressor housing, a stator and a compressor housing, or a combination thereof. In one aspect, a tolerance ring can be fitted around an inner component (e.g., the main frame, the lower frame, the stator, etc.) and then, the compressor housing can be heated and expanded and placed over the inner component. As the compressor housing cools and shrinks, the inner wall of the contracting compressor housing can apply a compressive force on the wave structures of the tolerance ring. The compressive force at each wave structure can be transmitted to a first plurality of component engagement structures.

Each component engagement structure can be located opposite the wave structure. In other words, each component engagement structure can be formed on, or extends from, an opposite surface from the wave structure. Further, each component engagement structure can be formed in an area that is overlapped the force footprint of the wave structure. The compressive force provided by the shrinking compressor housing can force, or otherwise cause, the component engagement structures to extend into an engage the outer wall of the inner component. Thus, the tolerance ring will be sufficiently engaged with the inner component and the tolerance ring can prevent the inner component from rotating with respect to the tolerance ring.

The tolerance ring can also include a second plurality of component engagement structures that extend from the wave structures in a direction opposite the first plurality of engagement structures. Specifically, each of the second plurality of component engagement structures can extend from a face of each wave structure and as the outer component shrinks, each of the second plurality of component engagement structures can extend into and engage an inner wall of the outer component. Accordingly, the tolerance ring can be locked in place between the inner component and the outer component. The use of the first plurality of component engagement structures, the second plurality of component engagement structures, or a combination thereof, can sufficiently couple the inner component to the outer component and a welding operation to affix, or attach, the inner component and the outer component to each other can be eliminated.

Figure 1:
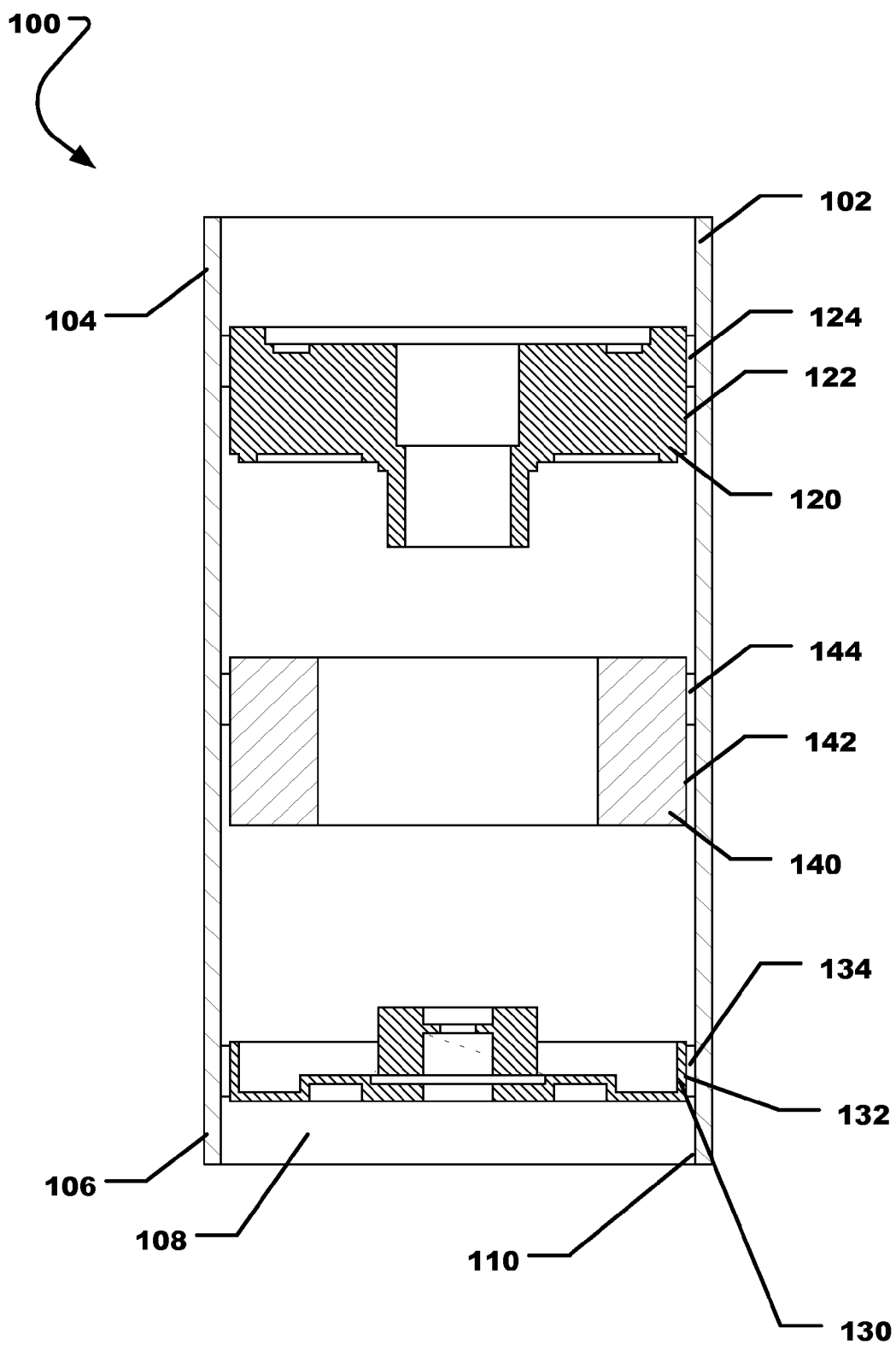
FIG. 1 includes a cross-sectional view of a compressor assembly in accordance with an embodiment.

Referring initially to FIG. 1, a compressor assembly is shown and is generally designated 100. The compressor assembly 100 can include a compressor housing 102 that can define a proximal end 104 and a distal end 106. Further, the compressor housing 102 can include an internal cavity 108 defined by an inner wall 110 of the compressor housing 102. A plurality of static compressor components can be installed within the compressor housing 102 and engaged therewith.

For example, as illustrated, the compressor assembly 100 can include a main frame 120 disposed within the compressor housing 102 near the proximal end 104 of the compressor housing 102. The main frame 120 can include an outer wall 122. A first tolerance ring 124 can be disposed around the main frame 120 and the first tolerance ring 124 can engage the outer wall 122 of the main frame 120 and the inner wall 110 of the compressor housing 102, as described in detail below, in order to securely lock the main frame 120 within the compressor housing 102.

The compressor assembly 100 can include a lower frame 130 disposed within the compressor housing 102 near the distal end 106 of the compressor housing 102. The lower frame 130 can include an outer wall 132. A second tolerance ring 134 can be disposed around the lower frame 130 and the second tolerance ring 134 can engage the outer wall 132 of the lower frame 130 and the inner wall 110 of the compressor housing 102, as described in detail below, in order to securely lock the lower frame 130 within the compressor housing 102.

Additionally, the compressor assembly 100 can include a stator 140 disposed within the compressor housing 102 between the main frame 120 and the lower frame 130. The stator 140 can include an outer wall 142. A third tolerance ring 144 can be disposed around the stator 140 and the third tolerance ring 144 can engage the outer wall 142 of the stator 140 and the inner wall 110 of the compressor housing 102, as described in detail below, in order to securely lock the stator 140 within the compressor housing 102.

In a particular aspect, the main frame 120, the lower frame 130, the stator 140, or a combination thereof, can be formed with a groove in the outer wall 122, 132, 142 that is configured to receive a respective tolerance ring 124, 134, 144. The groove can be an open groove flanked on one end by outer wall material so that the wall of the groove has a general "L" shape. Moreover, the groove can be a closed groove flanked on both ends by outer wall material so that the groove has a general "U" shape. The length of each groove can be approximately the same as the length of the respective tolerance ring 124, 134, 144 installed therein. Further, the depth of each groove can be less than the overall thickness of the respective tolerance ring 124, 134, 144 installed therein.

In a particular aspect, during assembly, the first tolerance ring 124 can be fitted over the main frame 120, the second tolerance ring 134 can be fitted over the lower frame 130, and the third tolerance ring 144 can be fitted over the stator 140 (not necessarily in that order). These sub-assemblies can be properly aligned with, and spaced apart from, each other for further assembly to the compressor housing 102.

Before, during, or after alignment and placement of the sub-assemblies, the compressor housing 102 can be heated in order to expand the compressor housing 102 and the expanded compressor housing 102 can be placed over the sub-assemblies as illustrated in FIG. 1.

As the compressor housing 102 cools and contracts, the inner wall 110 of the compressor housing 102 can engage the first tolerance ring 124, the second tolerance ring 134, and the third tolerance ring 144 and apply a compressive force on the first tolerance ring 124, the second tolerance ring 134, and the third tolerance ring 144. The compressive force can cause the first tolerance ring 124, or components thereof, to engage the main frame 120, the compressor housing 102 or a combination thereof. The compressive force can cause the second tolerance ring 134, or components thereof, to engage the lower frame 130, the compressor housing 102 or a combination thereof. Moreover, the compressive force from the cooling and shrinking compressor housing 102 can cause the third tolerance ring 144, or components thereof, to engage the stator 140, the compressor housing 102 or a combination thereof.

In particular, as described in detail below, a first plurality of component engagement structures on the first tolerance ring 124 can extend into and engage the outer wall 122 of the main frame 120. Further, a second plurality of component engagement structures on the first tolerance ring 124 can extend into and engage the inner wall 110 of the compressor housing 102. Accordingly, the first tolerance ring 124 can lock, or otherwise secure, the main frame 120 to the compressor housing 102.

Additionally, a first plurality of component engagement structures on the second tolerance ring 134 can extend into and engage the outer wall 132 of the lower frame 130. A second plurality of component engagement structures on the second tolerance ring 134 can extend into and engage the inner wall 110 of the compressor housing 102. As such, the second tolerance ring 134 can lock, or otherwise secure, the lower frame 130 to the compressor housing 102.

A first plurality of component engagement structures on the third tolerance ring 144 can extend into and engage the outer wall 142 of the stator 140. Further, a second plurality of component engagement structures on the third tolerance ring 144 can extend into and engage the inner wall 110 of the compressor housing 102. Accordingly, the third tolerance ring 144 can lock, or otherwise secure, the stator 140 to the compressor housing 102.

Referring now to FIG. 2 through FIG. 5, an exemplary tolerance ring is illustrated and is generally designated 200. The tolerance ring 500 depicted in FIG. 2 through FIG. 5 (and any other of the tolerance rings described herein) can be used in the compressor assembly 100 described above. Further, similar or dissimilar tolerance rings can be used throughout the compressor assembly 100.

Figure 2:
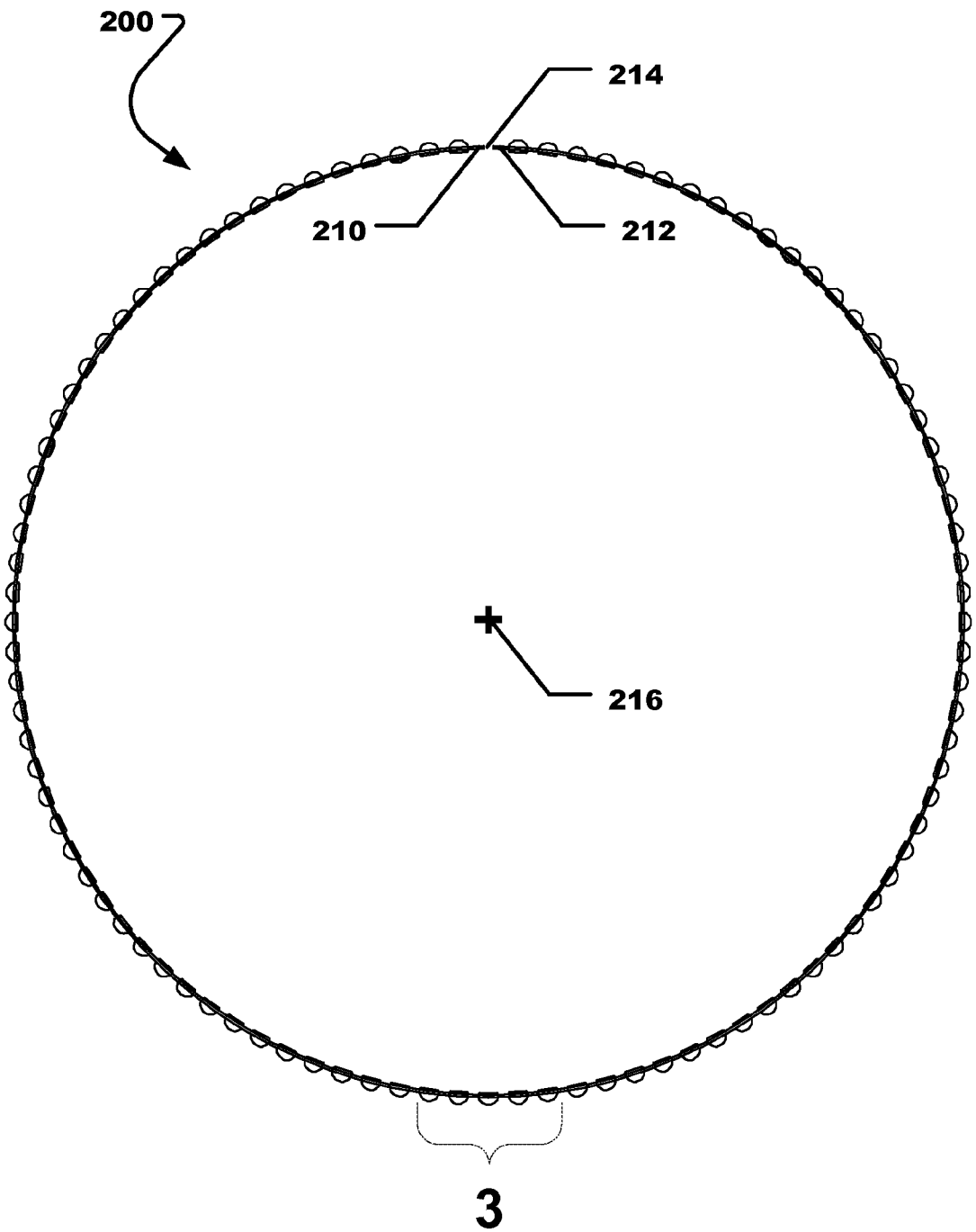
FIG. 2 includes a top plan view of a tolerance ring in accordance with an embodiment.

As depicted in FIG. 2 through FIG. 5, the tolerance ring 200 can include a generally cylindrical body 202 having a generally cylindrical sidewall 204. The sidewall 204 can include a top 206 and a bottom 208. Further, the sidewall 204 can include a first end 210 and a second end 212. Moreover, a gap 214 can be established between the first end 210 and the second end 212 of the sidewall 204. The gap 214 can extend completely through the sidewall 204 in order to form a split in the sidewall 204 and the tolerance ring 200. As illustrated in FIG. 2, the tolerance ring 200 can include a center 216.

Figure 3:
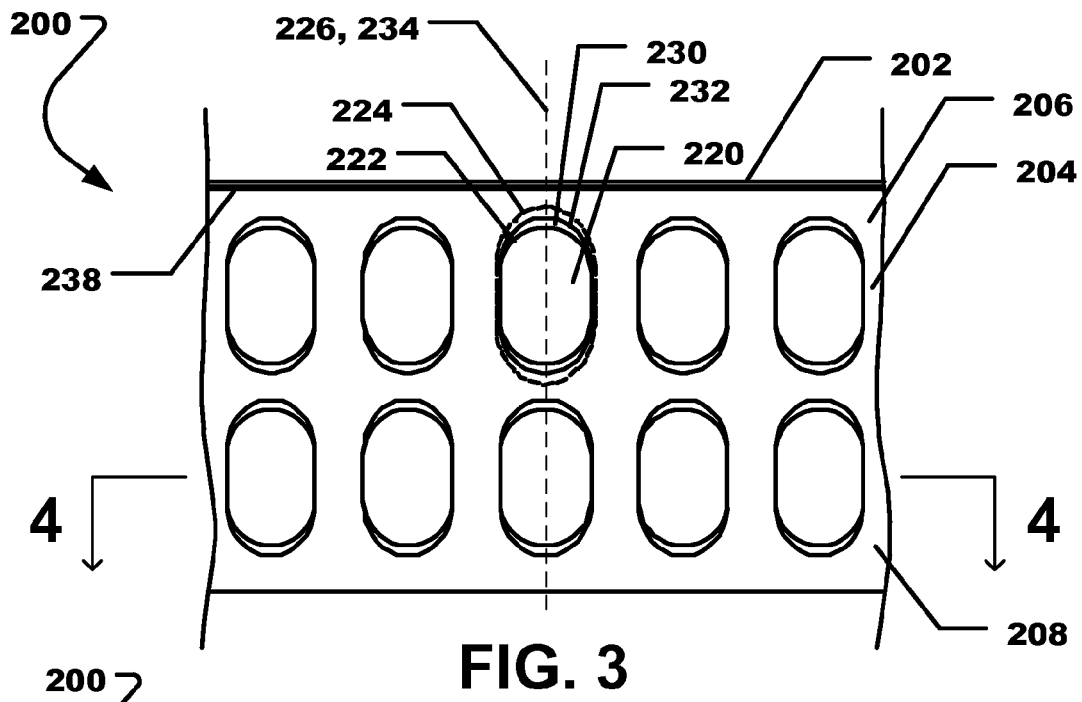
FIG. 3 includes a partial side plan view of a tolerance ring in accordance with an embodiment taken at location 3 in FIG. 2.

FIG. 2 through FIG. 5 indicate that the tolerance ring 200 can include a plurality of wave structures 220 formed in the sidewall 204. The wave structures 220 can extend outwardly from the sidewall 204 away from the center 216 of the tolerance ring 200. Each wave structure 220 can have a generally hemi-cylindrical body with generally hemi-spherical ends. Further, in plan view as illustrated in FIG. 3, each wave structure 220 can be generally oval in shape.

The tolerance ring can include one row of wave structures, two rows of wave structures, three rows of wave structures, etc. Further, a total number of wave structures, $N_{WS}$, in each row can be $\geq 10$, such as $\geq 12$, $\geq 14$, $\geq 16$, $\geq 18$, $\geq 20$, $\geq 22$, $\geq 24$, $\geq 26$, $\geq 28$, $\geq 30$, $\geq 32$, $\geq 34$, $\geq 36$, $\geq 38$, or $\geq 40$. Further, $N_{WS} \leq 200$, $\leq 190$, $\leq 180$, $\leq 170$, $\leq 160$, $\leq 150$, $\leq 140$, $\leq 130$, $\leq 120$, $\leq 110$, or $\leq 100$. $N_{WS}$ can be within a range between and including any of the $N_{WS}$ values above.

In another aspect, the tolerance ring 200 may include a number of wave blanks, i.e., unformed waves, opposite the gap 214 so that the sidewall 204 opposite the gap 214 is unformed and does not include any waves. For example, the tolerance ring 200 may include $\geq 2$ unformed waves opposite the gap 214, such as $\geq 2$, $\geq 4$, $\geq 6$, $\geq 8$, or $\geq 10$. The number of unformed waves opposite the gap 214 can be $\leq 40$, such as $\leq 30$, or $\leq 20$. The number of unformed waves opposite the gap 214 can be within a range between and including any of the values listed in the above paragraph. The wave blanks are centered on an axis that passes through the center of the tolerance ring 216 and bisects the gap 214.

Each wave structure 220 can include an outer perimeter 222. Further, each wave structure 220 can included a force footprint 224 that extends beyond the outer perimeter 222 of the wave structure 220. The force footprint 224 is an indication of the area of the tolerance ring 200, e.g., the area of the sidewall 204, over which a force acting perpendicular to the wave structure 220 toward the center 216 of the tolerance ring 200 is transmitted.

In a particular aspect, the force footprint 224 can have a perimeter that is similar in shape to the perimeter 222 of the wave structure 220 associated with the force footprint 224. However, the area, $A_{FF}$, bound by the perimeter of the force footprint 224 can be $\geq$ than the area, $A_{WS}$, of the perimeter 222 bound by the outer perimeter 222 of the wave structure. For example, $A_{FF}$ can be $\geq 105\% A_{WS}$, such as $110\% \geq A_{WS}$, $120\% \geq A_{WS}$, $130\% A_{WS}$, $140\% A_{WS}$, or $150\% A_{WS}$. In another aspect, $A_{FF}$ can be $\leq 400\% A_{WS}$, such as $\leq 350\% A_{WS}$, $\leq 300\% A_{WS}$, $\leq 250\% A_{WS}$, or $\leq 200\% A_{WS}$. $A_{FF}$ can also be within a range between and including any of the % $A_{WS}$ values above.

FIG. 3 also indicates that each wave structure 220 can include a central axis 226. Each wave structure 220 can be symmetrical about the central axis 226.

FIG. 2 through FIG. 5 also illustrate that the tolerance ring 200 can include a first plurality of component engagement structures 230. Each of the first plurality of component engagement structures 230 can be formed adjacent to the outer perimeter 222 of a wave structure 220. Further, each of the first plurality of component engagement structures 230 can include an outer perimeter 232 and a portion of the outer perimeter 232 of each of the first plurality of engagement structures 230 can be collinear with the outer perimeter 222 of an adjacent wave structure 220.

For example, a collinearity, C, of the outer perimeter 232 of each component engagement structure 230 with the outer perimeter 222 of an adjacent wave structure 220 can be $\geq 10\%$. As such, at least 10% of the outer perimeter 232 of each component engagement structure 230 can be collinear with the outer perimeter 222 of the adjacent wave structure 220 and formed along the same linear, curvilinear, or linear/curvilinear line or lines. In another aspect, C, can be $\geq 20\%$, such as $\geq 25\%$, $\geq 30\%$, $\geq 35\%$, $\geq 45\%$, or $\geq 50\%$. Further, C can be $\leq 75\%$, such as $\leq 70\%$, $\leq 65\%$, or $\leq 60\%$. C can also be within a range between and including any of the values of C described above.

Each of the first plurality of component engagement structures 230 can include a central axis 234 and the central axis 234 of each of the first plurality of component engagement structures 230 can be aligned with the central axis 226 of a respective wave structure 220.

Figure 4:
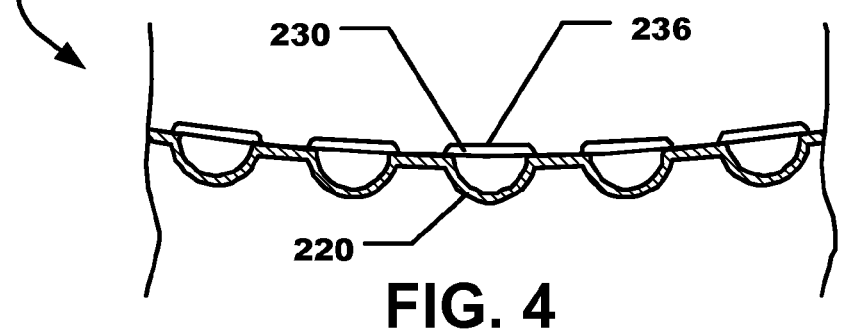
FIG. 4 includes a cross-sectional view of a tolerance ring in accordance with an embodiment taken along Line 4-4 in FIG. 3.
Figure 5:
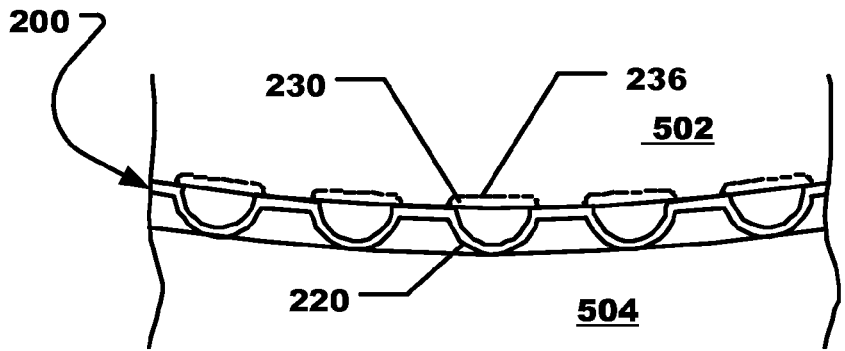
FIG. 5 includes a partial top plan view of a tolerance ring in accordance with an embodiment installed between an inner component and an outer component.

As indicated in FIG. 4 and FIG. 5, each of the first plurality of component engagement structures 230 can extend from the sidewall 204 in a direction that is opposite the direction in which the wave structures 220 extend. For example, if the wave structures 220 extend outwardly away from the center 216 of the tolerance ring 200, the first plurality of component engagement structures 230 can extend inwardly toward the center 216 of the tolerance ring 200.

As illustrated in FIG. 4 and FIG. 5, each of the first plurality of component engagement structures 230 can have a distal edge 236 that is curved. Specifically, the curvature of each distal edge 236 can match the curvature of the sidewall 204. Depending on the orientation of the first plurality of component engagement structures 230, the distal edge 236 of each can be an inner edge or an outer edge.

Accordingly, when the tolerance ring 200 is installed around an inner component 502, such as a stator, a main frame, a lower frame, a shaft, a bearing, etc., and a contracting outer component 504 is placed around the tolerance ring 200, the contracting outer component 504 can provide a compressive force that can act on each of the wave structures 220. The compressive force on each wave structure 220 can be transmitted to a respective component engagement structure 230, which is opposite the wave structure 220 and aligned with the wave structure 220, via the force footprint 224 of the wave structure 220. The force provided by the outer component 504 as the outer component 504 contracts can be great enough to drive the respective component engagement structure 230, or the distal edge 236 thereof, at least partially into the inner component 502. Specifically, each of the first plurality of component engagement structures 230, or the distal edges thereof, can extend at least partially into the outer wall of the inner component 502.

As illustrated in FIG. 3, the tolerance ring 200 can include an end feature 238 extending radially from the top 206 of the sidewall 204. The end feature 238 may be a flange or radial hub extending inward from the sidewall 204 towards the center 216 of the tolerance ring 200. The end feature 238 can be positioned concomitant with a distal end of the inner component 502 to prevent relative axial translation between the inner component 502 and the tolerance ring 200 in a single axial direction. In another aspect, an extra row of the component engagement structures 230 can be positioned along the tolerance ring 200 such that the extra row is concomitant with the distal end of the inner component 502. In other words, the extra row of the component engagement structures 230 may be positioned beyond the distal end of the inner component 502, concomitant with the distal end such that the extra row of the component engagement structures 230 engage the distal end of the inner component 502 and prohibit relative translation of the inner component 502 in a first axial direction. In a further aspect, relative axial translation may be prohibited by an extra row of wave structures 220 positioned longitudinally concomitant with the distal end of the inner component 502.

As illustrated in FIG. 2, FIG. 4, and FIG. 5, the wave structures 220 can extend in an outward direction with respect to the center 216 of the tolerance ring 200 and the component engagement structures 230 can extend in an inward direction with respect to the center 216 of the tolerance ring 200. However, in another aspect, the wave structures 220 can extend in an inward direction toward the center 216 of the tolerance ring 200 and the component engagement structures 230 can extend in an outward direction away from the center 216 of the tolerance ring 200.

In a particular aspect, each of the plurality of wave structures 220 can include a depth, $D_{WS}$, measured from a first face of the sidewall 204 to a distal point on the wave structure 220. The first face of the sidewall 204 can be an outer face of the sidewall 204 and the distal point on the wave structure 220 can be the outer most point of the wave structure 220. Each the first plurality of component engagement structures 230 can include a depth, $D_{CES1}$, that can be measured from a second face of the sidewall 204, and $D_{CES1} \leq D_{WS}$ to a distal point on the component engagement structure 230. The second face of the sidewall 204 can be an inner face of the sidewall 204 and the distal point on the component engagement structure 230 can be an inner most point on the component engagement structure 230.

$D_{CES1}$ can be $\leq 50\%$ $D_{WS}$, such as $\leq 45\%$ $D_{WS}$, $\leq 40\%$ $D_{WS}$, $\leq 35\%$ $D_{WS}$, $\leq 30\%$ $D_{WS}$, or $\leq 25\%$ $D_{WS}$. Further, $D_{CES1}$ can be $\geq 1\%$ $D_{WS}$, such as $\geq 2\%$ $D_{WS}$, $\geq 3\%$ $D_{WS}$, $\geq 4\%$ $D_{WS}$, or $\geq 5\%$ $D_{WS}$. $D_{CES1}$ can be within a range between and including any of the % of $D_{WS}$ values described herein.

Further, the tolerance ring 200 can include an outer diameter, $D_O$, and $D_{CES1}$ can be $\leq 5\%$ $D_O$, such as $\leq 4\%$ $D_O$, $\leq 3\%$ $D_O$, $\leq 2\%$ $D_O$, or $\leq 1\%$ $D_O$. $D_{CES1}$ can be $\geq 0.1\%$ $D_O$, such as $\geq 0.2\%$ $D_O$, $\geq 0.3\%$ $D_O$, $\geq 0.4\%$ $D_O$, or $\geq 0.5\%$ $D_O$. Moreover, $D_{CES1}$ can be within a range between and including any of the % of $D_O$ values.

In another aspect, each of the first plurality of component engagement structures 230 can be at least partially overlapped by the force footprint 224 of an adjacent wave structure 220. In other words, at least a portion of each of the first plurality of component engagement structures 230 can be located within an area bound by the perimeter of the force footprint 224 of an adjacent wave structure 220. As such, at least a portion of a force acting on particular wave structure 220 can be transmitted to an adjacent one of the first plurality of component engagement structures 230 via the force footprint 224 of the wave structure 220.

In particular, an amount of overlap, O, of each of first plurality of component engages structures 230 by the force footprint 224 of an adjacent wave structure 220 can be $\geq 50\%$, such as $\geq 55\%$, $\geq 60\%$, $\geq 65\%$, $\geq 70\%$, or $\geq 75\%$. Further, O can be $\leq 100\%$, $\leq 99\%$, $\leq 98\%$, $\leq 97\%$, $\leq 96\%$, $\leq 95\%$, or $\leq 90\%$. In another aspect, O can be within a range between and including any of the % values described in this paragraph. O can be the % of an area, or perimeter, of each of the first plurality of component engagement structures that is overlapped.

In another aspect, the sidewall 204 of the tolerance ring 200 of can have a wall thickness, $T_W$, and $D_{CES1}$ can be $\leq 200\%$ $T_W$, such as $\leq 175\%$ $T_W$, $\leq 150\%$ $T_W$, $\leq 125\%$ $T_W$, or $\leq 100\%$ $T_W$. Further, $D_{CES1}$ can be $\geq 25\%$ $T_W$, such as $\geq 50\%$ $T_W$, or $\geq 75\%$ $T_W$. $D_{CES1}$ can also be within a range between and including any of the % $T_W$ values described above.

In yet another aspect, first ratio of a number of wave structures 220 to a number of first component engagement structures 230, $R_1$, can be $\geq 0.25:1$, such as $\geq 0.5:1$, $\geq 0.75:1$, or $\geq 1:1$. Further, $R_1$ can be $\leq 20:1$, $\leq 15:1$, $\leq 10:1$, $\leq 5:1$, $\leq 4:1$, $\leq 3:1$, or $\leq 2:1$. $R_1$ can be within a range between and including any of the $R_1$ values described above.

Figure 6:
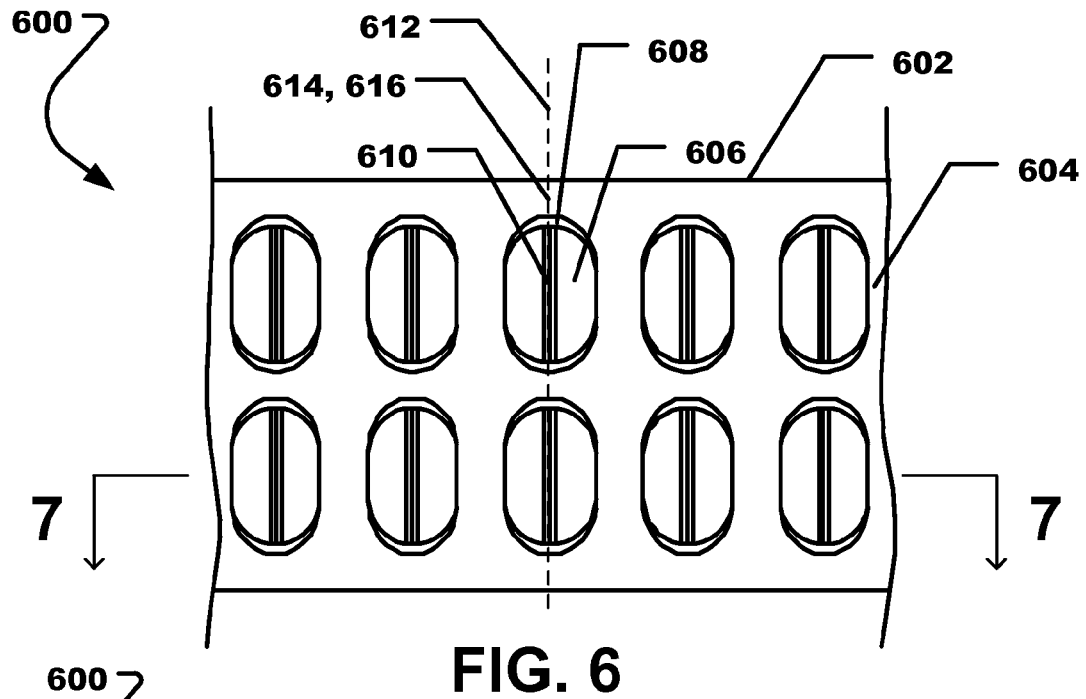
FIG. 6 includes a partial side plan view of a tolerance ring in accordance with another embodiment.
Figure 7:
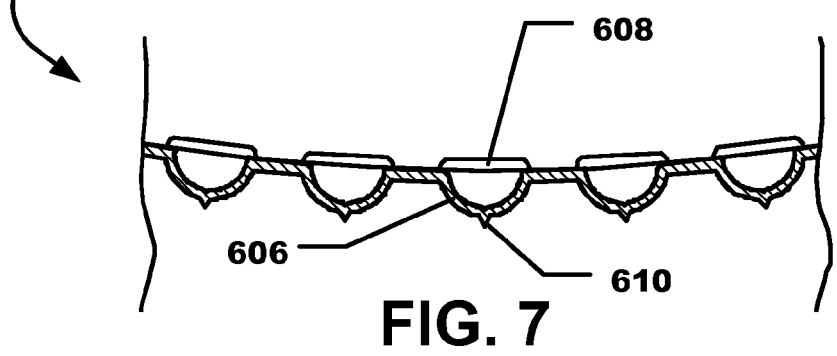
FIG. 7 includes a cross-sectional view of a tolerance ring in accordance with another embodiment taken along Line 7-7 in FIG. 6.
Figure 8:
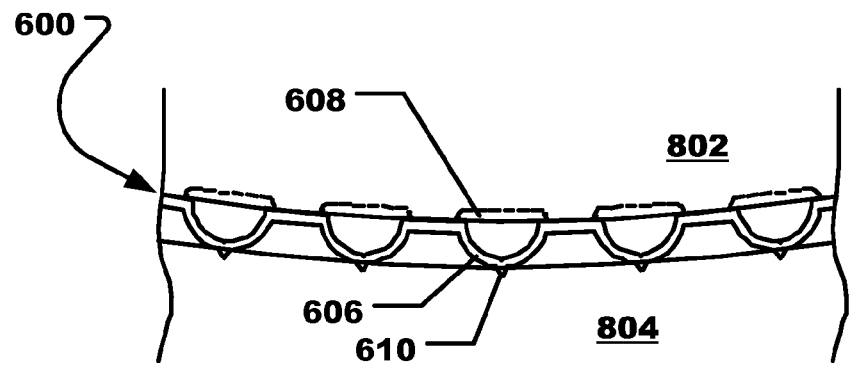
FIG. 8 includes a partial top plan view of a tolerance ring in accordance with another embodiment installed between an inner component and an outer component.

Referring to FIG. 6 through FIG. 8, another embodiment of a tolerance ring is shown and is generally designated 600. The tolerance ring 600 can include a generally cylindrical body 602 having a generally cylindrical sidewall 604.

As indicated in FIG. 6, the tolerance ring 600 can include a plurality of wave structures 606 that can extend outwardly from the sidewall 604 away from a center of the tolerance ring 600. The tolerance ring 600 can also include a first plurality of component engagement structures 608 that can extend inwardly from the sidewall 604 toward a center of the tolerance ring 600.

FIG. 6 through FIG. 8 further illustrate that the tolerance ring 600 can also include a second plurality of component engagement structures 610. Each of the second plurality of component engagement structures 610 can be formed in a respective wave structure 606 and can extend outwardly from the wave structures 606 away from a center of the tolerance ring 600. Each of the second plurality of component engagement structures 610 can be oriented in a direction parallel to a longitudinal axis 612 of the tolerance ring 600. Further, each of the second plurality of component engagement structures 610 can have a generally triangular cross-section.

As indicated in FIG. 6, each wave structure 606 can include a central axis 614 and each of the second plurality of component engagement structures 610 can have a central axis 616. The central axis 614 of each wave structure 606 and the central axis 616 of each of the second plurality of component engagement structures 610 can be collinear and can be parallel to the longitudinal axis 612 of the tolerance ring.

In a particular aspect, each of the plurality of wave structures 606 can include a depth, $D_{WS}$, measured from a first face of the sidewall 604. The first face can be an outer face of the sidewall 604. Each of the second plurality of component engagement structures 610 can include a depth, $D_{CES2}$, that can be measured from a face, or perimeter, of a wave structure 610. $D_{CES2}$ can be ≤$D_{WS}$. Specifically, $D_{CES2}$ can be ≤50% $D_{WS}$, such as ≤45% $D_{WS}$, ≤40% $D_{WS}$, ≤35% $D_{WS}$, ≤30% $D_{WS}$, or ≤25% $D_{WS}$. Further, $D_{CES2}$ can be ≥1% $D_{WS}$, such as ≥2% $D_{WS}$, ≥3% $D_{WS}$, ≥4% $D_{WS}$, or ≥5% $D_{WS}$. $D_{CES2}$ can be within a range between and including any of the % $D_{WS}$ values described herein.

In another aspect, the tolerance ring 600 can include outer diameter, $D_O$, and $D_{CES2}$ can be ≤5% $D_O$, such as ≤4% $D_O$, ≤3% $D_O$, ≤2% $D_O$, or ≤1% $D_O$. Moreover, $D_{CES2}$ can be ≥0.1% $D_O$, such as ≥0.2% $D_O$, ≥0.3% $D_O$, ≥0.4% $D_O$, or ≥0.5% $D_O$. $D_{CES2}$ can be within a range between and including any of the % $D_O$ values above.

As illustrated in FIG. 6, each of the plurality of wave structures 606, e.g., the face thereof, can include a length, $L_{WS}$, and each of the second plurality of component engagement structures can extend at least partially along $L_{WS}$. Specifically, each of the second plurality of component engagement structures 606 can extend along at least 10% $L_{WS}$, such as 15% $L_{WS}$, 25% $L_{WS}$, 50% $L_{WS}$, 75% $L_{WS}$, 80% $L_{WS}$, 85% $L_{WS}$, or 90% $L_{WS}$. In another aspect, each of the second plurality of component engagement structures 606 can extend along 100% $L_{WS}$.

In another aspect, each of the plurality of wave structures 606, e.g., the face thereof, can include a width, $W_{WS}$, and wherein each of the second plurality of component engagement structures 610 can extend at least partially along $W_{WS}$. In particular, each of the second plurality of component engagement structures 610 can extend along at least 10% $W_{WS}$, such as 15% $W_{WS}$, 25% $W_{WS}$, 50% $W_{WS}$, 75% $W_{WS}$, 80% $W_{WS}$, 85% $W_{WS}$, or 90% $W_{WS}$. Further, each of the second plurality of component engagement structures 610 can extend along 100% $W_{WS}$.

In another aspect, the sidewall 604 of the tolerance ring 600 can includes a wall thickness, $T_W$, and $D_{CES2}$ can be ≤200% $T_W$, such as ≤175% $T_W$, ≤150% $T_W$, ≤125% $T_W$, or ≤100% $T_W$. Moreover, $D_{CES2}$ can be ≥25% $T_W$, such as ≥50% $T_W$, or ≥75% $T_W$. $D_{CES2}$ can be within a range between and including any of the % $T_W$ values described herein.

Each of the second plurality of component engagement structures 610 can be substantially parallel to the longitudinal axis 612 of the tolerance ring 600 as illustrated in FIG. 6. However, each of the second plurality of component engagement structures 610 can be substantially horizontal to the longitudinal axis 612 of the tolerance ring 600. In another aspect, each of the second plurality of component engagement structures 610 can be angle with respect to the longitudinal axis 612. Moreover, each of the second plurality of engagement structures 610 can be continuous or discontinuous (i.e., each can include two or more discrete portions). Further, each of the second plurality of engagement structures 610 can have portions that intersect to form an "X" shape, a "+" shape, or a similar shape. Moreover, each of the second plurality of engagement structures 610 can be flanked by a pair of the first plurality of engagement structures 608 extending from the sidewall 604 near each end of a respective wave structure 606.

As illustrated in FIG. 8, when the tolerance ring 600 is installed around an inner component 802, such as a stator, a main frame, a lower frame, a shaft, a bearing, etc., and a contracting outer component 804 is placed around the tolerance ring 600, the contracting outer component 804 can provide a compressive force that can act on each of the wave structures 606. The compressive force on each wave structure 600 can be transmitted to a respective member of the first component engagement structures 608, as described above.

Each of the first plurality component engagement structures 608 can extend at least partially into and engage the outer wall of the inner component 802. Further, the compressive force caused by the contracting outer component 804 can cause the outer component 804 to engage the second plurality of component engagement structures 610 so that each of the second plurality of component engagement structures 610 extends at least partially into and engages an inner wall of the outer component 804.

In a particular aspect, a second ratio of a number of wave structures 606 to a number of second component engagement structures 610, $R_2$, can be ≥0.25:1, such as ≥0.5:1, ≥0.75:1, ≥1:1. Further, $R_2$ can be ≤20:1, ≤15:1, ≤10:1, ≤5:1, ≤4:1, ≤3:1, or ≤2:1. $R_2$ can be within a range between and including any of the $R_2$ values described above.

Figure 9:
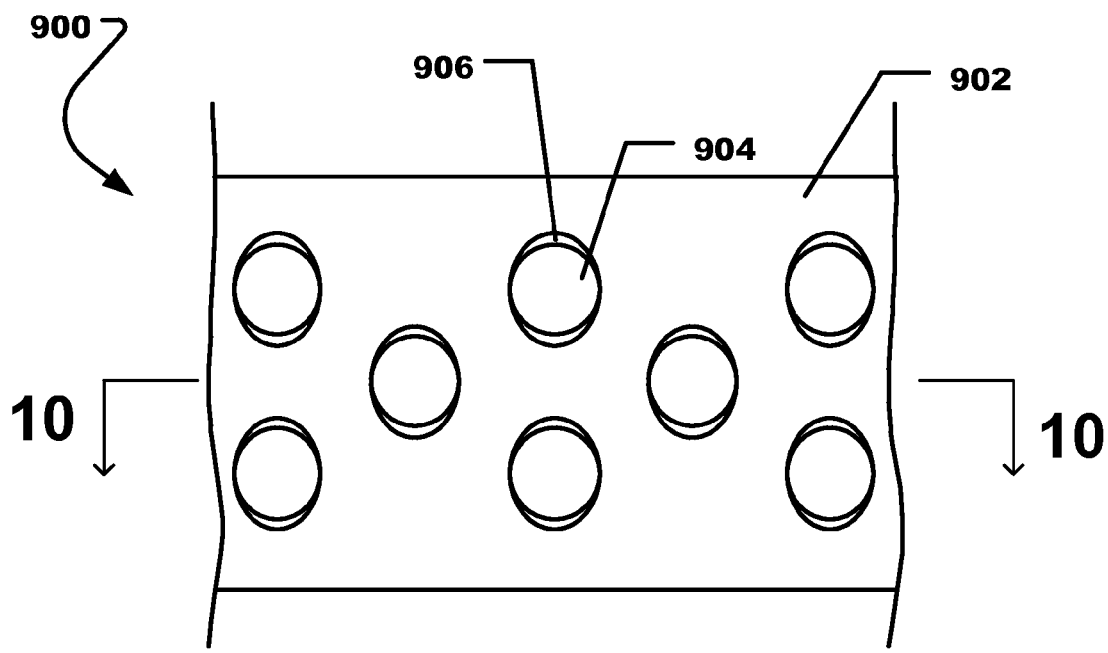
FIG. 9 includes a partial side plan view of a tolerance ring in accordance with yet another embodiment.
Figure 10:
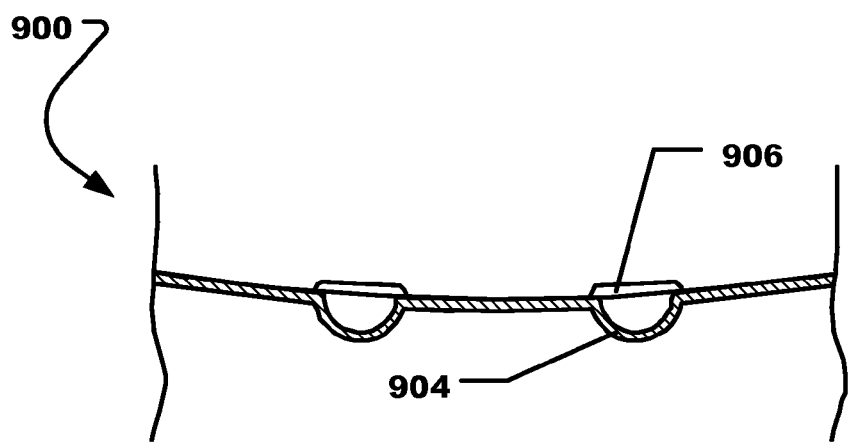
FIG. 10 includes a cross-sectional view of a tolerance ring in accordance with yet another embodiment taken along Line 10-10 in FIG. 9.

FIG. 9 and FIG. 10 illustrate another embodiment of a tolerance ring 900. The tolerance ring 900 can include a sidewall 902 formed with a plurality of generally hemi-spherical wave structures 904. The plurality of wave structures 904 can extend outwardly from the sidewall 902. The tolerance ring 900 can also include a first plurality of component engagement structures 906 that can extend from the sidewall 902 in a direction opposite the wave structures 904, i.e., inwardly from the sidewall 902.

Figure 11:
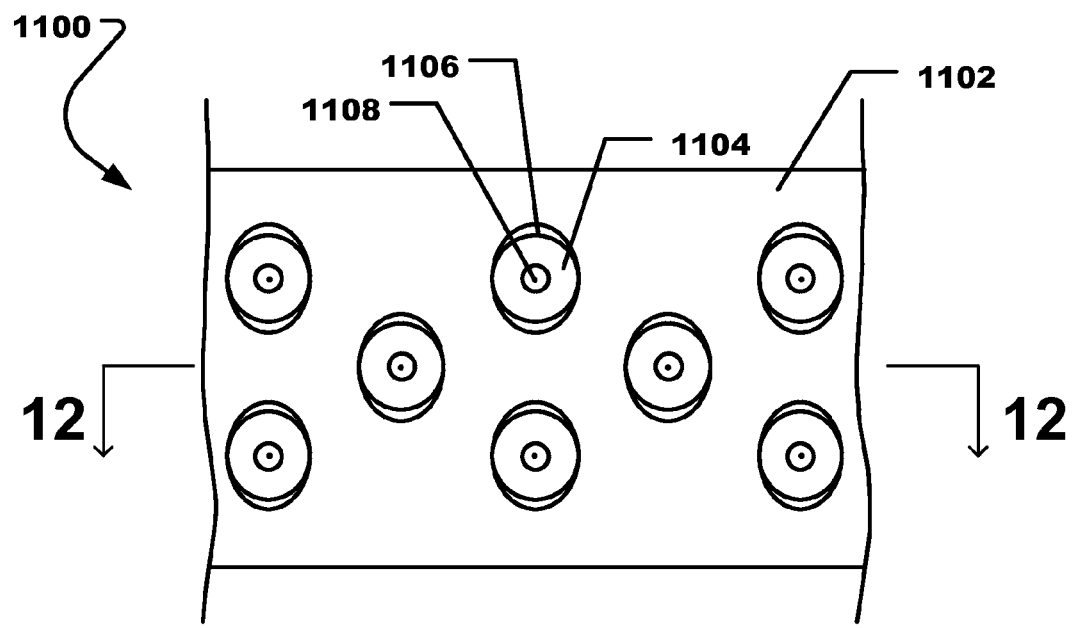
FIG. 11 includes a partial side plan view of a tolerance ring in accordance with still another embodiment.
Figure 12:
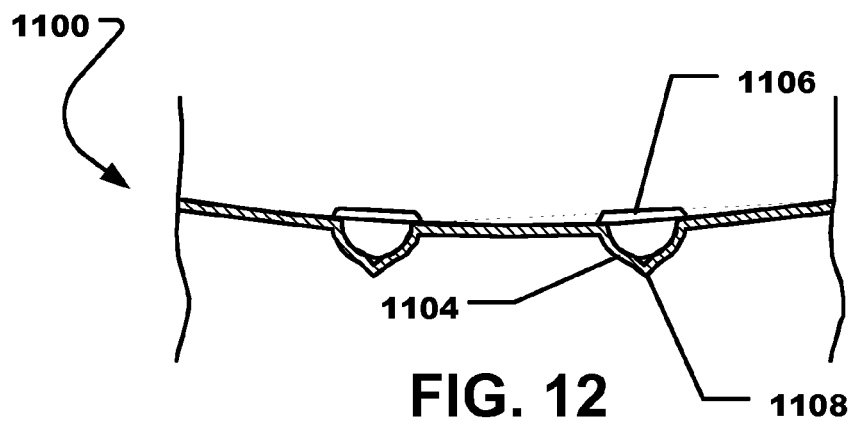
FIG. 12 includes a cross-sectional view of a tolerance ring in accordance with still another embodiment taken along Line 12-12 in FIG. 11.

Referring to FIG. 11 and FIG. 12, yet another embodiment of a tolerance ring is illustrated and is generally designated 1100. The tolerance ring 1100 can include a sidewall 1102 formed with a plurality of generally hemi-spherical wave structures 1104. The plurality of wave structures 1104 can extend outwardly from the sidewall 1102. As illustrated, the tolerance ring 1100 can also include a first plurality of component engagement structures 1106 that can extend from the sidewall 1102 in a direction opposite the wave structures 1104, i.e., inwardly from the sidewall 902.

The tolerance ring 1100 illustrated in FIG. 11 and FIG. 12 can also include a second plurality of component engagement structures 1108. Each of the second plurality of component engagement structures 1108 can be generally cone-shaped and can extend outwardly from a respect wave structure 1104 in a direction opposite the first plurality of component engagement structures 1106.

Figure 13:
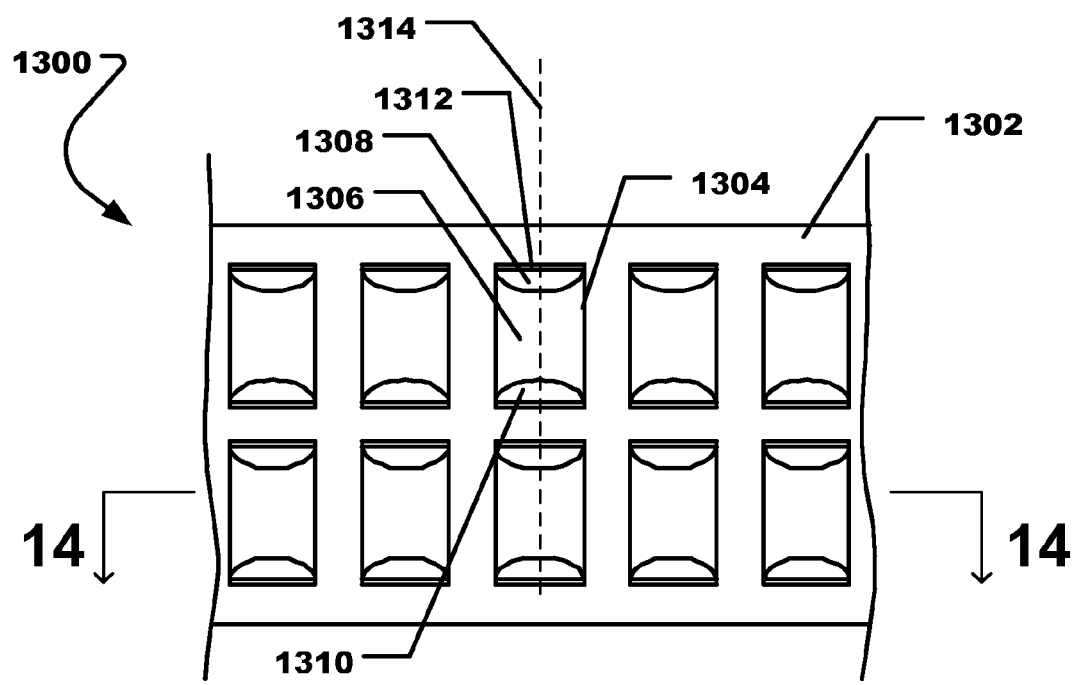
FIG. 13 includes a partial side plan view of a tolerance ring in accordance with yet still another embodiment.
Figure 14:
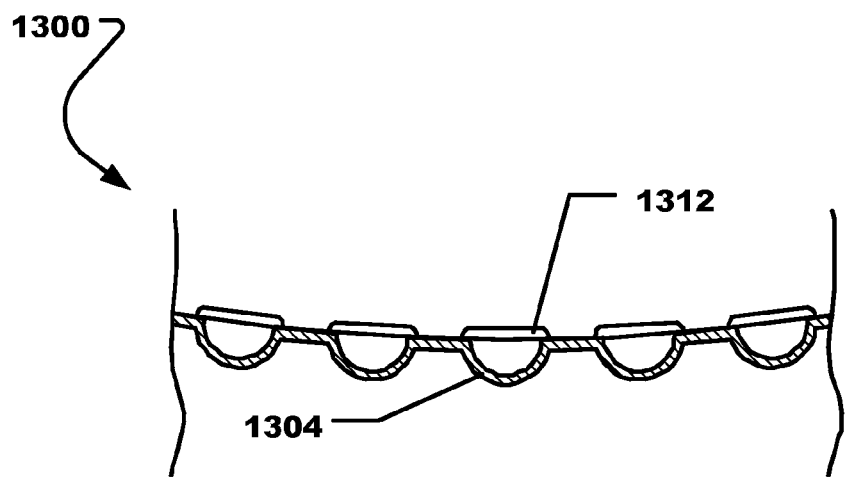
FIG. 14 includes a cross-sectional view of a tolerance ring in accordance with yet still another embodiment taken along Line 14-14 in FIG. 13.

FIG. 13 and FIG. 14 illustrate another embodiment of a tolerance ring 1300. The tolerance ring 1300 can include a sidewall 1302 formed with a plurality of generally hemi-cylindrical wave structures 1304 extending from the sidewall 1302. Each of the plurality of wave structures 1304 can have a rounded surface 1306 that is flanked by a flat upper surface 1308 and a flat lower surface 1310. The tolerance ring 1300 can also include a first plurality of component engagement structures 1312 that can extend from the sidewall 1302 in a direction opposite the wave structures 1304. Each of the first plurality of component engagement structures 1310 can be formed near an edge of a flat surface 1306, 1308 of a wave structure and can be perpendicular to a longitudinal axis 1314 of the tolerance ring 1300.

Figure 15:
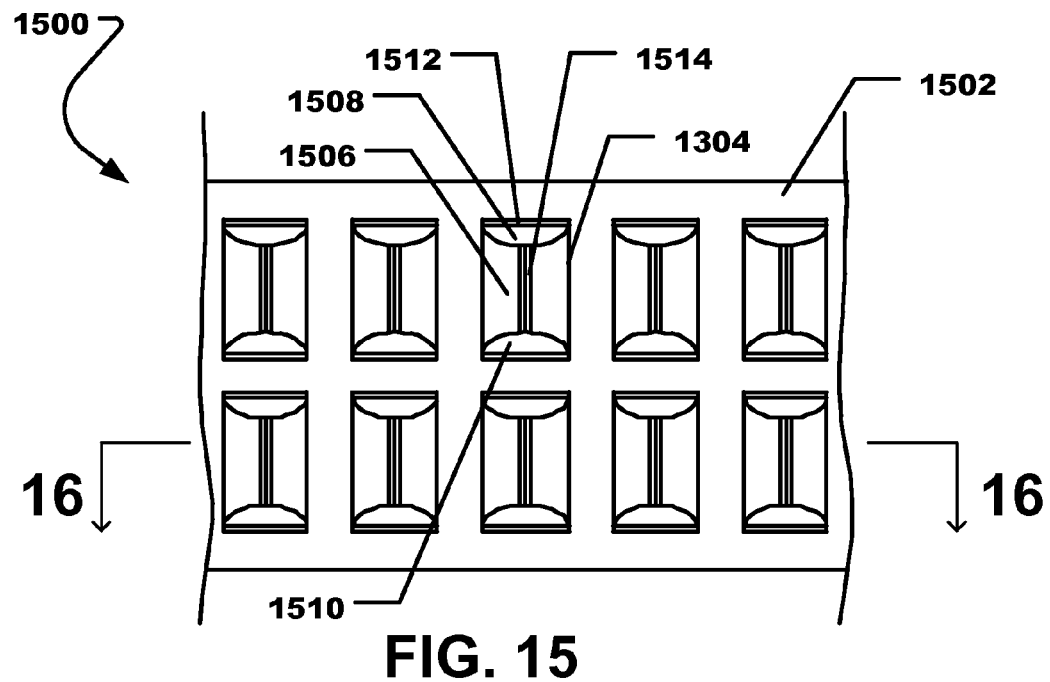
FIG. 15 includes a partial side plan view of a tolerance ring in accordance with another embodiment.
Figure 16:
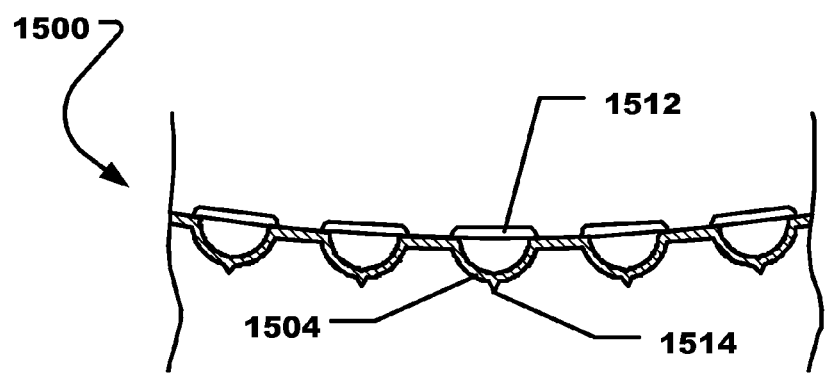
FIG. 16 includes a cross-sectional view of a tolerance ring in accordance with another embodiment taken along Line 16-16 in FIG. 15.

FIG. 15 and FIG. 16 depict yet another embodiment of a tolerance ring 1500. The tolerance ring 1500 can include a sidewall 1502 formed with a plurality of generally hemi-cylindrical wave structures 1504 extending from the sidewall 1502. Each of the plurality of wave structures 1504 can have a rounded surface 1506 that can be flanked by a flat upper surface 1508 and a flat lower surface 1510. The tolerance ring 1500 can also include a first plurality of component engagement structures 1512 that can extend from the sidewall 1302 in a direction opposite the wave structures 1504. The tolerance ring 1500 can also include a second plurality of component engagement structures 1514 and each can extend from the curved rounded surface 1506 of a wave structure 1504. The first plurality of component engagement structures 1512 can be perpendicular to the second plurality of component engagement structures 1514.

Figure 17:
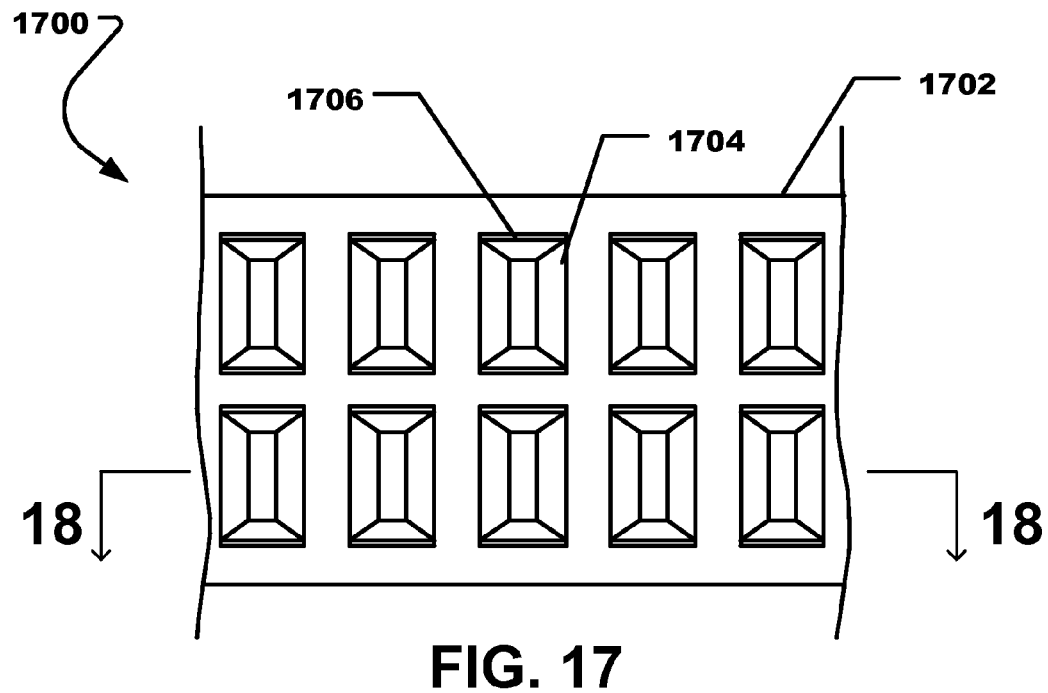
FIG. 17 includes a partial side plan view of a tolerance ring in accordance with yet another embodiment.
Figure 18:
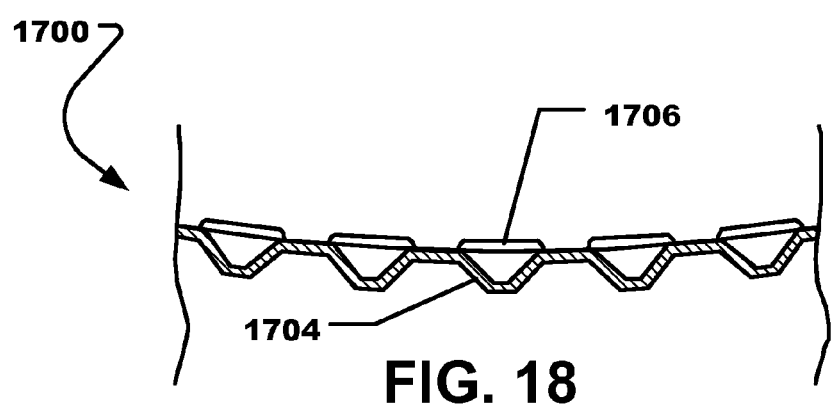
FIG. 18 includes a cross-sectional view of a tolerance ring in accordance with yet another embodiment taken along Line 18-18 in FIG. 17.

Referring now to FIG. 17 and FIG. 18, still another embodiment of a tolerance ring 1700 is illustrated. The tolerance ring 1700 can include a sidewall 1702 formed with a plurality of wave structures 1704 having a generally flat-top pyramid shape. The tolerance ring 1700 can also include a first plurality of component engagement structures 1706 that can extend from the sidewall 1702 in a direction opposite the wave structures 1704. Each of the first plurality of component engagement structures 1706 can be formed near an upper edge or a lower edge of a wave structure 1704. Alternatively, each of the first plurality of component engagement structures 1706 can be formed near a left edge or a right edge of a wave structure.

Figure 19:
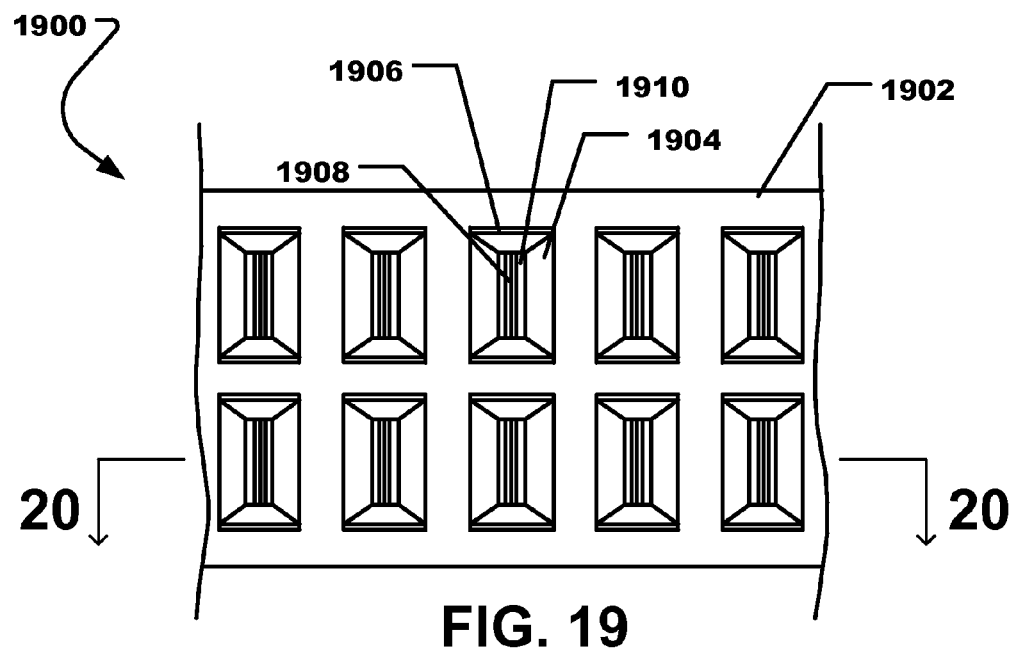
FIG. 19 includes a partial side plan view of a tolerance ring in accordance with another embodiment.
Figure 20:
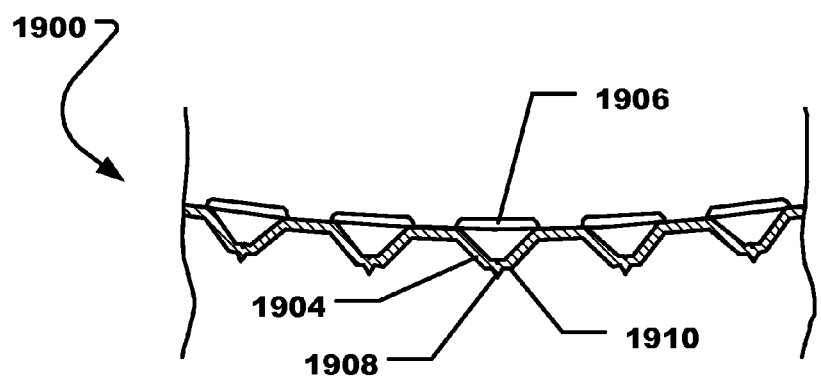
FIG. 20 includes a cross-sectional view of a tolerance ring in accordance with another embodiment taken along Line 20-20 in FIG. 19.

FIG. 19 and FIG. 20 depict another embodiment of a tolerance ring 1900. The tolerance ring 1900 can include a sidewall 1902 formed with a plurality of wave structures 1904 having a generally flat-top pyramid shape. The tolerance ring 1900 can include a first plurality of component engagement structures 1906 that can extend from the sidewall 1902 in a direction opposite the wave structures 1904. Further, the tolerance ring 1900 can include a second plurality of component engagement structures 1908 and each of the second plurality of component engagement structures 1908 can be formed in a flat distal surface 1910 of a wave structure 1904. Each of the second plurality of component engagement structures 1910 can extend in a direction that is opposite the direction of the first plurality of component engagement structures 1906.

Figure 21:
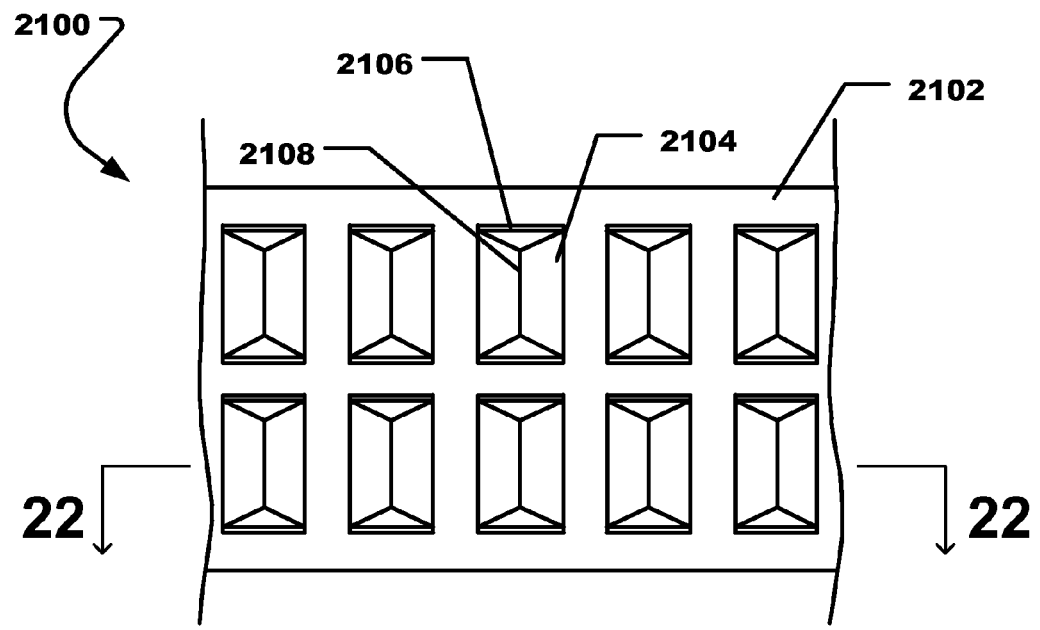
FIG. 21 includes a partial side plan view of a tolerance ring in accordance with still another embodiment.
Figure 22:
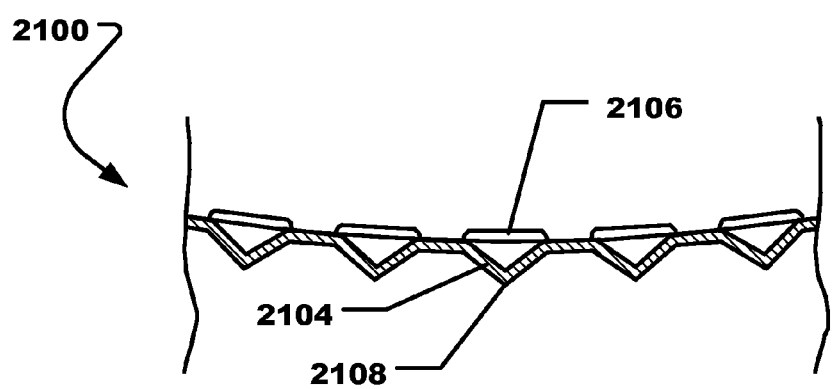
FIG. 22 includes a cross-sectional view of a tolerance ring in accordance with still another embodiment taken along Line 22-22 in FIG. 21.

Referring to FIG. 21 and FIG. 22, another embodiment of a tolerance ring 2100 is illustrated. The tolerance ring 2100 can include a sidewall 2102 formed with a plurality of wave structures 2104 having a generally triangular cross-sectional shape. The tolerance ring 2100 can include a first plurality of component engagement structures 2106 that can extend from the sidewall 2102 in a direction opposite the wave structures 2104. Further, each of the wave structures 2104 can include a distal edge 2108 formed at the apex of two angled surfaces. The distal edges 2108 of the wave structures 2104 can act as a second plurality of component engagement structures that extend in a direction that is opposite the direction of the first plurality of component engagement structures 2106.

In each of the embodiments described herein, the wave structures and the component engagement structures can be evenly space around the circumference of the sidewall wall of the tolerance ring. However, these structures can be staggered so they get progressively closer or progressively farther apart. Further, these structures can be grouped and the groups can be evenly spaced around the circumference of the sidewall of the tolerance ring.

Moreover, in other aspects, depending on a particular application, a single tolerance ring can include any combination of the different wave structures and the different component engagement structures. Further, a single tolerance ring can include any number of similar wave structures, any number of different wave structures, any number of similar component engagement structures, any number of different component engagement structures, or any combination thereof. Additionally, a particular tolerance ring can include wave structures facing inward, outward, or inward and outward. Similarly, a particular tolerance ring can include component engagement structures facing inward, outward, or inward and outward.

In a particular aspect, a tolerance ring according to any of the aspects described herein can be made from a metal, a metal alloy, or a combination thereof. The metal can include a ferrous metal. Further, the metal can include steel. The steel can include stainless steel, such as austenitic stainless steel. Moreover, the steel can include stainless steel comprising chrome, nickel, or a combination thereof. For example, the steel can X10CrNi18-8 1.4310 stainless steel. Further, the tolerance ring can include a Vickers pyramid number hardness, VPN, which can be ≥350, such as ≥375, ≥400, ≥425, or ≥450. VPN can also be ≤500, ≤475, or ≤450. VPN can also be within a range between, and including, any of the VPN values described herein. In another aspect, the tolerance ring can be treated to increase its corrosion resistance. In particular, the tolerance ring can be passivated. For example, the tolerance ring can be passivated according to the ASTM standard A967.

In another aspect, the stock material from which the tolerance ring can be formed can have a thickness, T, and T can be ≥0.1 mm, such as ≥0.2 mm, ≥0.3 mm, ≥0.4 mm, ≥0.5 mm, or ≥0.6 mm. In another aspect, T can be ≤1.0 mm, ≤0.9 mm, or ≤0.8 mm. Moreover, T can be within a range between, and including, any of the values of T disclosed above.

The tolerance ring according to any of the aspects described herein may have an overall outer diameter, OD, and OD can be ≥100 mm, such as ≥110 mm, ≥120 mm, ≥130 mm, ≥140 mm, or ≥150 mm. The OD can be ≤300 mm, such as ≤250 mm, or ≤175 mm. Further, OD can be within a range between and including any of the values of OD described herein.

In another aspect, the tolerance ring can have an overall length, L, and L can be ≥5 mm, ≥10 mm, ≥15 mm, ≥20 mm, or ≥25 mm. L can be ≤50 mm, such as ≤45 mm, ≤40 mm, ≤35 mm, or ≤30 mm. Moreover, L can be within a range between, and including, any of the values of L described above.

EXAMPLE

A test tolerance ring is manufactured from X10CrNi18-8 1.4310 stainless steel that is 0.6 mm thick and includes a hardness that is between 400-450 VPN. The outer diameter of the tolerance ring is approximately 159 mm. The tolerance ring has a length of approximately 15 mm. Each wave can have a wave pitch of approximately 6.3 mm. The tolerance ring includes 2 banks, or rows, of 32 waves with 6 wave blanks opposite the gap. Each wave includes a rounded, or radiused profile, and has a length of approximately 1.9 mm.

The tolerance ring is place around an inner component (i.e., a main frame) that is made from cast iron. The inner component has an outer diameter of approximately 158.75 mm±0.03 mm and the inner component is approximately 25 mm long. The inner component is formed with a groove that has an outer diameter of approximately 156.20 mm±0.03 mm. The groove has a width of approximately 14.75 mm±0.01 mm. The assembled tolerance ring/inner component sub-assembly weighs approximately 7.0 kgs.

An outer component (i.e., a housing) is provided. The outer component is made from hot rolled steel plate (SHP-1) and has an outer diameter of approximately 159.37 mm±0.1 mm, a wall thickness of approximately 4 mm, and a length of approximately 400 mm. The outer component weighs approximately 1.5 kgs.

The outer component is heated until the outer component expands sufficiently to be placed over the sub-assembly without engaging the sub-assembly. Thereafter, the outer component is cooled, or allowed to cool, to ambient temperature until the outer component returns to an original diameter and the sub-assembly, including the inner component, is secured therein.

The assembly is oriented so that a longitudinal axis of the assembly is either vertical or at 30° and the assembly is raised to a height of approximately 300 mm measured between a lower end of the assembly and the target surface. The assembly is released and allowed to drop vertically onto the target surface and the lower end of the assembly directly contacts the target surface. The displacement of the inner component relative to the outer component is less than approximately 0.25 mm.

A tolerance ring manufactured according to one or more aspects disclosed herein can be fitted around an inner component. An outer component can be heated, expanded, and placed over the inner component. As the outer component cools and shrinks, the inner wall of the outer component can apply a compressive force on a group of wave structures formed on the tolerance ring. The compressive force acting on each wave structure can be transmitted to a first plurality of component engagement structures that can be driven, or otherwise forced, into an outer wall of the inner component. Accordingly, the tolerance ring can be sufficiently engaged with the inner component and the tolerance ring can prevent the inner component from rotating with respect to the tolerance ring and the outer component with utilizing a welding operation.

If a stronger bond between the inner component and our component is needed, the tolerance ring can also include a second plurality of component engagement structures that extend from the wave structures in a direction opposite the first plurality of engagement structures, e.g., outward. In particular, each of the second plurality of component engagement structures can extend from a face, or outermost portion, of each wave structure and as the outer component shrinks, each of the second plurality of component engagement structures can be driven, or forced, into and engage an inner wall of the outer component. Accordingly, the tolerance ring can be locked in place between the inner component and the outer component and the inner component can be secured within the outer component.

The use of the first plurality of component engagement structures, the second plurality of component engagement structures, or a combination thereof, can sufficiently couple the inner component to the outer component and a welding operation to affix, or attach, the inner component and the outer component to each other can be eliminated.

In a particular aspect, a tolerance ring according to one or more aspects described herein and the particular features thereof, e.g., the wave structures and the component engagement structures, can be formed using a stamping operation. A flat piece of sheet stock can be placed between a pair of molds having features that are shaped according to the desired features to be stamped into the sheet stock (e.g., the various wave structure shapes and component engagement structure shapes described herein). After stamping, the stamped flat stock can be cut into strips and the strips can be rolled into tolerance rings having a generally cylindrical shape.

A skilled artisan may recognize other applications that may utilize a tolerance ring having one or more of the characteristics described herein.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all features of any of the disclosed embodiments. Thus, the following claims are incorporated into the Detailed Description, with each claim standing on its own as defining separately claimed subject matter.

What is claimed is:

1. A tolerance ring comprising:
   a generally cylindrical sidewall that defines a top, a bottom, and a central axis;
   a plurality of wave structures extending from the sidewall in a first direction; and
   a first plurality of discrete component engagement structures extending from the sidewall in a second direction opposite the first direction,
   wherein:
      each of the first plurality of component engagement structures is configured to at least partially extend into and engage a first component to which the tolerance ring is assembled,
      at least one of the first plurality of component engagement structures at least partially overlaps a wave structure of the plurality of wave structures in a radial direction such that a plane extending radially from the central axis intersects the at least one of the first plurality of component engagement structures and an apex of a corresponding wave structure, and
      the at least one of the first plurality of component engagement structures is radially spaced apart from the apex of the corresponding wave structure.

2. The tolerance ring of claim 1, wherein each of the plurality of wave structures includes a depth, $D_{WS}$, measured from a first face of the sidewall, each of the first plurality of component engagement structures includes a depth, $D_{CES1}$, measured from a second face of the sidewall, and $D_{CES1}$ is less than $D_{WS}$.

3. The tolerance ring of claim 2, wherein all of the plurality of waves extend in a same radial direction.

4. The tolerance ring of claim 2, wherein the tolerance ring includes an outer diameter, $D_O$, and $D_{CES1} \leq 5\% \, D_O$.

5. The tolerance ring of claim 2, wherein the sidewall includes a wall thickness, $T_W$, and $D_{CES1} \leq 200\% \, T_W$.

6. The tolerance ring of claim 1, wherein each of the plurality of wave structures includes a force footprint and wherein each of the first plurality of component engagement structures is at least partially overlapped by the force footprint of an adjacent wave structure.

7. The tolerance ring of claim 6, wherein an amount of overlap, O, of each of the first plurality of component engagement structures is $\geq 50\%$ of the force footprint of the adjacent wave structure.

8. The tolerance ring of claim 1, wherein each of the first plurality of component engagement structures includes a perimeter and at least a portion of the perimeter of each of the first plurality of engagement structure lies along a portion of the perimeter of a wave structure.

9. The tolerance ring of claim 1, wherein a first ratio of a number of wave structures to a number of first component engagement structures, $R_1$, is ≥0.25:1, and wherein $R_1$ is ≤20:1.

10. The tolerance ring of claim 1, further comprising a second plurality of component engagement structures extending from the plurality of wave structures, wherein each of the second plurality of component engagement structures is configured to at least partially extend into and engage a second component to which the tolerance ring is assembled.

11. The tolerance ring of claim 10, wherein each of the plurality of wave structures includes a depth, $D_{WS}$, measured from a first face of the sidewall, each of the second plurality of component engagement structures includes a depth, $D_{CES2}$, measured from a face of a wave structure, and $D_{CES2} \leq D_{WS}$.

12. The tolerance ring of claim 10, wherein the face of each of the plurality of wave structures includes a length, $L_{WS}$, and wherein each of the second plurality of component engagement structures extends at least partially along $L_{WS}$, and wherein each of the second plurality of component engagement structures extends along at least 10% of $L_{WS}$.

13. The tolerance ring of claim 10, wherein the face of each of the plurality of wave structures includes a width, $W_{WS}$, and wherein each of the second plurality of component engagement structures extends at least partially along $W_{WS}$, and wherein each of the second plurality of component engagement structures extends along at least 10% of $W_{WS}$.

14. The tolerance ring of claim 10, wherein the second plurality of component engagement structures extend in the second direction.

15. The tolerance ring of claim 10, wherein each of the plurality of wave structures comprises a central axis, wherein each of the second plurality of component engagement structures comprises a central axis, and wherein the central axis of each of the second plurality of component engagement structures is aligned with the central axis of a single wave structure.

16. The tolerance ring of claim 10, wherein a second ratio of a number of wave structures to a number of second component engagement structures, $R_2$, is ≥0.25:1.

17. An assembly, comprising:
an outer component including a bore within the outer component;
an inner component disposed within the bore; and
a tolerance ring mounted between the inner component and the outer component, the tolerance ring comprising:
a generally cylindrical sidewall that defines a top, a bottom, and a central axis;
a plurality of wave structures extending from the sidewall in a first direction; and
a first plurality of discrete component engagement structures extending from the sidewall in a second direction opposite the first direction,
wherein:
each of the first plurality of component engagement structures is configured to at least partially extend into and engage the inner component,
at least one of the first plurality of component engagement structures at least partially overlaps a perimeter corresponding wave structure of the plurality of wave structures, and
a plane extending radially from the central axis intersects each of the first plurality of component engagement structures and an apex of a corresponding wave structure.

18. The assembly of claim 17, wherein the tolerance ring further comprises a second plurality of component engagement structures extending from the plurality of wave structures in the first direction, wherein each of the second plurality of component engagement structures is configured to at least partially extend into and engage the outer component.

19. A compressor, comprising:
a compressor housing formed with a bore;
a static compressor component installed within the bore of the compressor housing; and
a tolerance ring installed around the static compressor component between the static compressor component and the compressor housing, the tolerance ring comprising:
a generally cylindrical sidewall that defines a top and a bottom;
a plurality of wave structures extending from the sidewall in a first direction; and
a first plurality of discrete component engagement structures extending from the sidewall in a second direction opposite the first direction,
wherein:
each of the first plurality of component engagement structures is configured to at least partially extend into and engage an outer wall of the static compressor component, and
at least one of the first plurality of component engagement structures entirely overlaps a perimeter of a corresponding wave structure of the plurality of wave structures in a radial direction.

20. The compressor of claim 19, wherein the tolerance ring further comprises a second plurality of component engagement structures extending from the plurality of wave structures in the first direction, wherein each of the second plurality of component engagement structures is configured to at least partially extend into and engage an inner wall of the compressor housing.

* * * * *